No. 653,095. Patented July 3, 1900.
J. W. KLINGELE.
CULTIVATOR.
(Application filed Oct. 12, 1899.)
(No Model.)
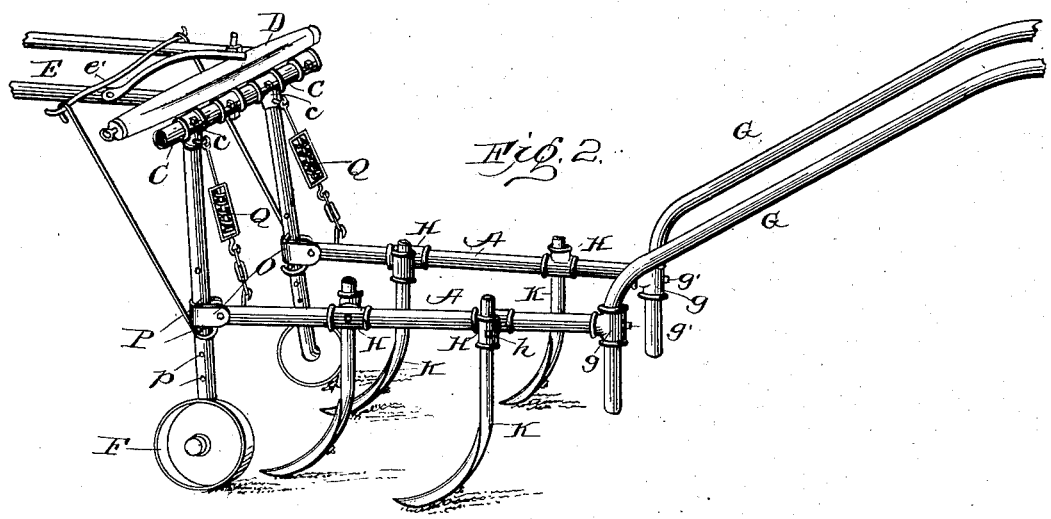
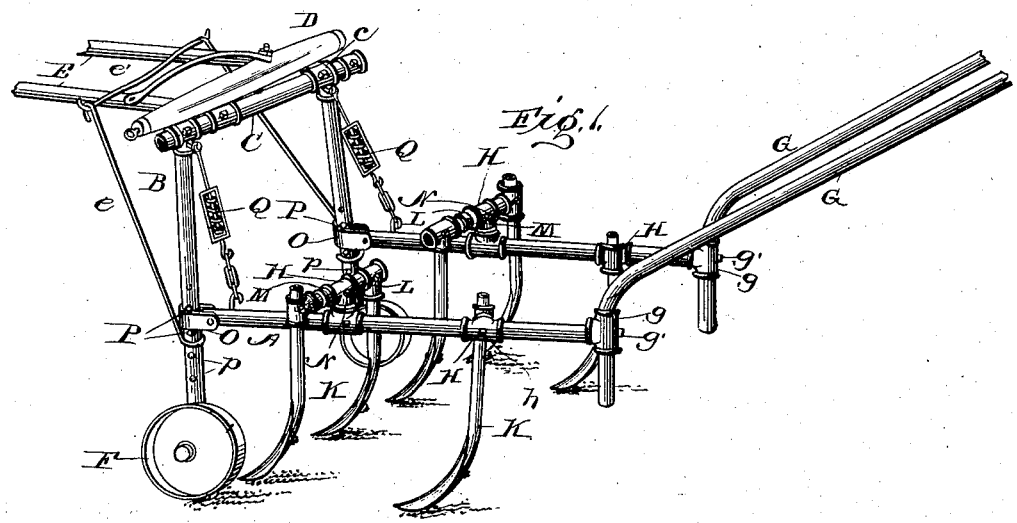

UNITED STATES PATENT OFFICE.

JOHN W. KLINGELE, OF QUINCY, ILLINOIS.

CULTIVATOR.

SPECIFICATION forming part of Letters Patent No. 653,095, dated July 3, 1900.

Application filed October 12, 1899. Serial No. 733,395. (No model.)

*To all whom it may concern:*

Be it known that I, JOHN W. KLINGELE, a citizen of the United States, and a resident of Quincy, in the county of Adams and State of Illinois, have invented certain new and useful Improvements in Cultivators; and I do hereby declare the following to be a full, clear, and exact description of the same, reference being had to the accompanying drawings, forming a part of this specification, and to the letters of reference marked thereon.

This invention relates to improvements in walking-cultivators, and has for its object the production of a cultivator of cheap and simple construction which shall be universally adjustable and adapted for cultivating wide or narrow rows, although more especially adapted for cultivating both sides of a single row of plants rather than the adjacent sides of two rows.

The invention consists in certain novel details of construction and combinations and arrangements of parts, all as will be hereinafter described, and pointed out particularly in the appended claims.

Referring to the accompanying drawings, Figure 1 is a perspective view of a cultivator embodying my present improvements. Fig. 2 is a similar view with the cross-bars for the double shovels removed.

Like letters of reference in both figures indicate the same parts.

In constructing a cultivator in accordance with my present invention use is preferably made as far as possible of tubular framing and T-couplings for uniting the several parts. Bearing this in mind and referring to the drawings, the letter A indicates two beams, preferably tubular and independently pivoted at their forward ends to the downwardly-extending legs B of an arch, the top of which arch is formed by a cross-piece C. The legs B and cross-piece C are connected by T-couplings $c$, and to the center of the cross-piece a tree D is pivoted for the attachment of the draft-animal. Shafts E extend forwardly from the cross-piece C, and diagonal brace-rods $e$, extending from a rod $e'$ on said shafts down to the legs B of the arch, serve to brace the structure against all ordinary strains, the lower ends of the diagonal rods, however, preferably passing around the legs B in the form of a hook or spring. On the lower ends of the arch suitable ground-wheels F are journaled.

The beams A at their rear ends are provided with T-couplings $g$, through which the lower ends of handles G are passed, and held in adjusted position by set-screws $g'$ or other suitable fasteners allowing of a ready adjustment of the handles to suit the height of the farmer or the character of work being performed.

At suitable intermediate points on the beams A double T-couplings H are secured by set-screws $h$ or fastenings which will permit the angular positions of the couplings to be changed at will. These couplings H constitute the supports for the teeth, the shanks K being mounted directly therein when so desired, as shown in Fig. 2, or where preferred and for certain kinds of work cross-beams L, carrying teeth at each end, may be mounted in the said T-couplings H.

When cross-beams L are employed, the couplings H are turned up into horizontal position, and in the preferred construction the cross-beams are made telescopic, with set-screws M for holding the sections in relative position and so as to provide for lateral adjustment of the teeth.

The double T-couplings H are preferably held together by set-screws N, permitting the angle of the teeth to be set properly for the soil and character of work to be performed. So, too, the shanks of the teeth are preferably round and held in place by set-screws, permitting their angle with relation to the line of draft to be varied at will.

Beams A, it will be noted, are independent in their movements, and in order to allow for a universal movement they are each pivotally connected with a collar O, surrounding a leg of the arch, and the collar is adjustably held against vertical movement by pins P, passed through any of a series of apertures $p$ in the legs, as shown. By changing the height of the collars O the depth at which the teeth will work may be fixed, and at the same time the beams A may be swung laterally to avoid striking any plants or other obstructions or to cultivate more closely to the plants at any particular point in the row.

To assist in raising the beams or for supporting them, springs Q may be extended diagonally from the arch to the beams, thereby materially reducing the labor of the farmer.

The width of the arch may be varied by adjusting the legs on the cross-piece, so as to adapt the device for wide or narrow rows or for use with one or two horses; but when intended for one horse and to straddle a row of plants the shafts and handles should be set off to one side to permit both the horse and farmer to walk along beside the row.

The device is at once simple, strong, and highly efficient, its universal adjustability adapting it for almost any agricultural operations involving the preparation of the soil and the cultivation of crops planted therein.

Any preferred type of teeth or shovels may be employed—as, for instance, the ordinary cultivator-shovels shown—or by properly adjusting the teeth and cross-beams wide shovels or moldboards may be employed and supported by two or more of the teeth, adapting the device for operation as a plow or scraper.

Having thus described my invention, what I claim as new, and desire to secure by Letters Patent of the United States, is—

1. In a cultivator, the combination with an arch having means for the attachment of a draft-animal and ground-wheels journaled at the lower ends of the legs of the arch, of independent beams, collars surrounding the legs of the arch and adjustable thereon to which the beams are pivotally connected, sockets on the rear ends of the beams, handles adjustably mounted in said sockets, and teeth adjustably mounted on the beams intermediate the handles and arch; substantially as described.

2. In a cultivator, the combination with the frame to which the draft-animal is attached, of tubular beams pivotally connected with said frame at their forward ends, a series of double T-couplings adjustably mounted on said beams and teeth having circular shanks adjustably mounted in said T-couplings; substantially as described.

3. In a cultivator, the combination with the frame to which the draft-animal is attached, of tubular beams pivotally connected with said frame at their forward ends, double T-couplings adjustably mounted on said beams, cross-beams mounted in said T-couplings, teeth carried by said cross-beams and independent handles for said beams; substantially as described.

4. In a cultivator, the combination with an arch formed of a tubular cross-piece and tubular legs adjustably connected therewith by T-couplings and ground-wheels journaled on said legs, of tubular beams, collars surrounding and adjustable vertically on said arch-legs, pivotal connections between said collars and beams, T-couplings adjustably mounted on the beams, teeth adjustably mounted in the intermediate T-couplings and handles adjustably mounted in the rear T-couplings; substantially as described.

5. In a cultivator, the combination with the arch to which the draft-animal is attached and independent beams pivotally attached to the legs of said arch with a controlling-handle for each beam, of T-couplings on said beams, telescopic cross-beams carried by said T-couplings and teeth carried by the ends of said cross-beams, whereby the said teeth may be adjusted transversely of the line of draft; substantially as described.

JOHN W. KLINGELE.

Witnesses:
L. E. EMMONS,
LAWRENCE E. EMMONS, Jr.